(12) United States Patent
Toyoda et al.

(10) Patent No.: US 6,497,082 B1
(45) Date of Patent: Dec. 24, 2002

(54) SANDWICH PANEL AND METHOD OF MANUFACTURING THE SANDWICH PANEL

(75) Inventors: Norihiko Toyoda, Tokyo (JP); Masamitsu Okamura, Tokyo (JP); Hiroshi Takayama, Tokyo (JP); Toshiaki Kunugi, Tokyo (JP); Masakatsu Kawasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,008

(22) Filed: Mar. 13, 2000

(30) Foreign Application Priority Data

Jul. 22, 1999 (JP) ............................................. 11-207426

(51) Int. Cl.⁷ ................................................ E04C 2/54
(52) U.S. Cl. ........................... 52/787.1; 52/630; 52/707; 52/783.17; 52/783.19; 52/793.1; 52/794.1; 29/458; 29/525; 156/66
(58) Field of Search ........................... 52/703–705, 708, 52/787.1, 783.11, 783.17, 783.19, 793.1, 794.1, 795.1, 630, 745.19, 745.2; 420/116; 411/83, 489, 490, 492, 496, 498; 29/446, 447, 448, 522.1, 525, 525.01; 156/66, 257, 268, 293

(56) References Cited

U.S. PATENT DOCUMENTS

| | | | |
|---|---|---|---|
| 3,451,181 A | * | 6/1969 | Neuschotz |
| 4,076,877 A | | 2/1978 | Tanzen |
| 4,428,705 A | * | 1/1984 | Gelhard ........................ 411/82 |
| 4,716,067 A | | 12/1987 | Moji et al. |
| 4,729,705 A | * | 3/1988 | Higgins ........................ 411/82 |
| 4,800,643 A | * | 1/1989 | Higgins ........................ 29/458 |
| 4,902,180 A | * | 2/1990 | Gauron ........................ 411/82 |
| 4,941,785 A | * | 7/1990 | Witten ........................ 411/82 |
| 5,082,405 A | * | 1/1992 | Witten ........................ 411/82 |
| 5,240,543 A | * | 8/1993 | Fetterhoff et al. ........... 156/293 |
| 5,536,344 A | * | 7/1996 | Van Dreumel ............. 156/73.5 |
| 5,713,706 A | * | 2/1998 | Lozano ........................ 411/171 |

FOREIGN PATENT DOCUMENTS

| | | |
|---|---|---|
| EP | 0 780 581 A1 | 6/1997 |
| JP | 6-126869 | 5/1994 |

* cited by examiner

*Primary Examiner*—Yvonne M. Horton
(74) *Attorney, Agent, or Firm*—Burns, Doane, Swecker & Mathis, LLP

(57) ABSTRACT

A sandwich panel is manufactured-by providing: a first step (a), (b) of attaching another end portion of an insert 1 whose one end portion is made sharp to an inner side of a facing member 2 in which a hole is cut in advance; a second step (c) of pressing the insert 1 into the core member 4 such that the one end portion of the insert 1 force-cuts a core member 4; and a third step (d) of attaching another facing member 2 to a side of the core member 4 opposing the insert-inserting side thereof.

13 Claims, 12 Drawing Sheets

SANDWICH PANEL AND METHOD OF MANUFACTURING THE SANDWICH PANEL

BACKGROUND OF THE INVENTION

1. Field of the Invention

The present invention relates to a sandwich panel used as a structural member of an artificial satellite, a space antenna, or the like, and a method of manufacturing the sandwich panel.

2. Description of the Related Art

Referring to FIGS. 15 and 16, a description will be given of the structure of a conventional sandwich panel and a method of assembling the same. FIG. 15 is a diagram illustrating an example of a conventional sandwich panel fabricated by a most common manufacturing process. In addition, a sandwich panel shown in FIG. 16 is the one shown in Japanese Patent Unexamined Publication No. 275930/1992. In FIGS. 15 and 16, reference numeral 2 denotes a facing member; 3, a film-like adhesive agent; 4, a coremember; 7, an insert; 7a, an upper flange; 7b, a threaded portion; 7c, a lower flange; 8, a filler; 9, an adhesive agent; 10, a fitting hole; 11, an insert; 11a, a flange; 11b, a threaded portion; 12, a through hole; and 13, an escape. First, a description will be given of the function of the insert incorporated in the sandwich panel. In FIGS. 15 and 16, the inserts 7 and 11 have threaded holes in the threaded portions 7b and 11b. Some apparatus, though not illustrated, is generally mounted on the surface of the sandwich panel used as a structural member of a satellite. The insert serves as a threaded hole for mounting this apparatus and a grounding plate of the apparatus. Since the apparatus is generally mounted by a plurality of screws, a screw pitch must be secured with high accuracy. In addition, as can be seen from FIG. 15, the upper surface of the insert 7 is attached in such a manner as to be located at a somewhat sunken position from the facing member 2. The purpose of this is to effect the radiation of the apparatus efficiently. Namely, by causing the apparatus and the facing member 2 to be brought into close contact with each other, the heat which is generated in the apparatus is transmitted to the facing member 2, and the heat is introduced to a radiating portion by a heat pipe (not shown) incorporated in the sandwich panel. However, if the upper surface of the insert 7 projects above the facing member 2, the close contact between the apparatus and the facing 2 is prevented.

Next, a description will be given of the method of manufacturing the sandwich panel shown in FIG. 15. First, a pair of assemblies in each of which the film-like adhesive agent 3 is attached-to the facing member 2 are prepared, and the core member 4 is sandwiched by them. In this state, heat is applied from the outside while applying pressure to allow the adhesive agent 3 to cure. The fitting hole 10 is cut in the thus-prepared sandwich panel by end milling. The inside diameter of the fitting hole 10 is in a fitting relationship with the outside diameter of the upper flange 7a of the insert 7, and serves to position the insert 7.

Next, after the adhesive agent 9 is applied to the bottom of the fitting hole 10, the height of the insert 7 is made capable of being positioned at a desired position by an unillustrated jig or the like. The insert 7 is then supplied, and the adhesive agent 9 is left to cure. After the curing of the adhesive agent 9, the filler 8 is supplied through such as a hole (not shown) provided in the upper flange 7a of the insert 7. When the filler 8 cures, the insert 7 and the core member 4 are firmly secured to each other. In a case where vehement vibrations are applied such as during the launching of the satellite, the apparatus on the sandwich panel also vibrates, so that a large pulling load is applied to the insert 7. However, the reason that the sandwich panel is not broken during such a time is that the load is distributed since the pulling load acting on the insert 7 is transmitted to the core member 4 through the filler 8.

Next, referring to FIG. 16, a description will be given of a structure and a manufacturing method which are different from those of the sandwich panel shown in FIG. 15.

The insert 11 has the same function as that of the insert 7 shown in FIG. 15. The insert 11 differs greatly from the insert 7 in that the insert 11 is bonded to the reverse side of the facing member 2 and that the filler 8 is not used. Namely, the major characteristic is that the heat is distributed since the apparatus mounted on the sandwich panel can be brought into close contact with the facing member 2 at a portion other than the through hole 12 through which the fixing screw is passed and that the pulling load applied to the insert 11 is transmitted to the facing member 2 through the upper flange 11a having a large outside diameter.

Next, a description will be given of the method of manufacturing the sandwich panel shown in FIG. 16. First, the through hole 12 is cut in the facing member 2 to which the insert 11 is attached. Subsequently, the insert 11 is bonded to the facing member 2 by some method. At this time, the hole 13 is provided in advance in the core member 4 in a separate step as a space for disposing the insert 11 on the inner side of the core member 4 (this step will be referred to as that of escape machining, and the hole as the escape). In an ensuing step, the core member 4 with the escape 13 machined therein is positioned and supplied onto the facing member 2 with the insert 11 bonded thereto and the film-like adhesive agent 3, and the facing member 2 and the film-like adhesive agent 3 on the opposite side are supplied. In this state, if pressurization and heating are effected to cure the adhesive agent 3, the sandwich panel incorporating the insert 11 is formed.

With the sandwich panel of the conventional structure shown in FIG. 15 referred to above, not only is it necessary to effect assembly by using a jig or the like while exercising caution so that the upper surface of the insert does not project from the upper surface of the facing member and does not become excessively depressed, but also it is necessary to pour the filler so that voids will not be created inside. For this reason, there has been a problem in that the insert attaching operation becomes a difficult and time-consuming operation. Further, the hole for attaching the insert must be machined in the sandwich panel after the adhesive agent is cured; however, there has been a problem in that an extreme risk is entailed in the provision of mechanical processing in such a sandwich panel that a heat pipe, for instance, is embedded in its interior as with a heat pipe panel used in a structural member of a satellite. Namely, if the heat pipe becomes damaged due to poor workmanship in the hole machining, ammonia which is a deleterious substance jets out.

In addition, the insert used in the conventional structure required the lower flange portion for retaining the solidified filler to sufficiently ensure pulling strength, the upper flange for fitting to the fitting hole, and the small diameter portion which provides the space for the filler to enter and is used to reduce the weight of the insert itself. For this reason, the component shape becomes that with a large cutting allowance, so that there has been a problem in that the unit cost of the component becomes high.

Meanwhile, with the sandwich panel of the conventional structure shown in FIG. 16, not only is it necessary to effect hole cutting or escape machining before the sandwiching of both the facing member and the core member, but also it is necessary to accurately position the facing member with the insert bonded thereto and the core member provided with the escape machining. Therefore, there has been a problem in that productivity is poor. Further, since a lateral force is applied to the core in the escape machining of only the core member before sandwiching the facing member and the core member, there has been a problem in that the core is liable to become deformed, and the productivity is further aggravated.

In addition, as for the insert as well, since it is necessary to make compatible the making the weight as light as possible and the enlarging of the area of the portion coming into contact with the facing member to alleviate the shearing force, the allowance still becomes large, pushing up the unit cost.

SUMMARY OF THE INVENTION

The present invention has been devised to overcome the above-described problems, and its object is to provide a method of manufacturing a high-quality sandwich panel with high productivity by making it possible to improve the shape of the insert and its attaching method, improving the operating efficiency in the insert attaching step, and lowering the unit cost of manufacturing the insert itself.

According to a first method of the present invention, there is provided a method of manufacturing a sandwich panel in which a core member is provided between a pair of facing members, and to which an insert for mounting an apparatus thereon is attached, comprising: a first step of attaching another end portion of the insert whose one end portion is made sharp to an inner side of one of the facing members in which a hole is cut in advance; a second step of pressing the insert into the core member such that the one end portion of the insert force-cuts the core member; and a third step of attaching the other one of the facing members to a side of the core member opposing the insert-inserting side thereof.

According to a second method of the present invention, in the method of manufacturing a sandwich panel according to the first method, the one end portion of the insert is provided with a line of intersection of two planes so as to be made sharp.

According to a third method of the present invention, in the method of manufacturing a sandwich panel according to the second method, the line of intersection is provided in such a manner as to abut against the core member in parallel.

According to a fourth method of the present invention, in the method of manufacturing a sandwich panel according to the first method, the one end portion of the insert is formed in a conical shape.

According to a fifth method of the present invention, in the method of manufacturing a sandwich panel according to any one of the second to fourth methods, the line of intersection or an apex of the conical shape of the one end portion of the insert intersects with a central axis of the insert.

According to a sixth method of the present invention, in the method of manufacturing a sandwich panel according to the first method, in the first step, after the insert itself is heated, the insert is pressed against a film-like adhesive agent laid on the facing member, and a part of the film-like adhesive agent is thereby fused to bond and fix the insert to the facing member.

According to a seventh method of the present invention, in the method of manufacturing a sandwich panel according to the first method, a projecting portion is provided at the other end portion of the insert, and the projecting portion of the insert is fitted in the hole cut in the facing member in the first step so as to effect the positioning of the insert.

According to an eighth method of the present invention, in the method of manufacturing a sandwich panel according to the first method, the insert has a small-diameter portion on its side where the facing member is attached, the diameter of the small-diameter portion being smaller than that of the one end portion, an expandable adhesive agent which foams on heating is wound around the small-diameter portion before the second step, and the expandable adhesive agent is allowed to cure in the third step.

According to a ninth method of the present invention, in the method of manufacturing a sandwich panel, the insert has a flange the diameter of which is identical or substantially identical with that of one end portion of the insert on a surface attached to the facing member.

According to a tenth method of the present invention, in the method of manufacturing a sandwich panel according to the eighth method, the one end portion and the small-diameter portion of the insert are formed as separate component parts.

According to an eleventh method of the present invention, in the method of manufacturing a sandwich panel according to the eighth method, a stepped portion or a groove portion is provided at the small-diameter portion of the insert to allow the expandable adhesive agent to flow around the stepped portion or the groove portion.

According to a twelfth method of the present invention, in the method of manufacturing a sandwich panel according to the first method, a thermosensitive material is used as the one end portion of the insert to allow the material to fill a space between the insert and the core member in the third step.

In addition, according to the present invention, there is provided a sandwich panel in which a core member is provided between a pair of facing members, and to which an insert for mounting an apparatus thereon is attached, wherein the insert is attached to an inner side of one of the facing members in which a hole is cut, an end portion of the insert on a side away from a facing-member attaching side thereof is made sharp, and the insert is attached by force-cutting the core member by the end portion.

DETAILED DESCRIPTION OF THE PREFERRED EMBODIMENTS

First Embodiment

Hereafter, a description will be given of a first embodiment of the present invention with reference to the drawings.

Figure 1:
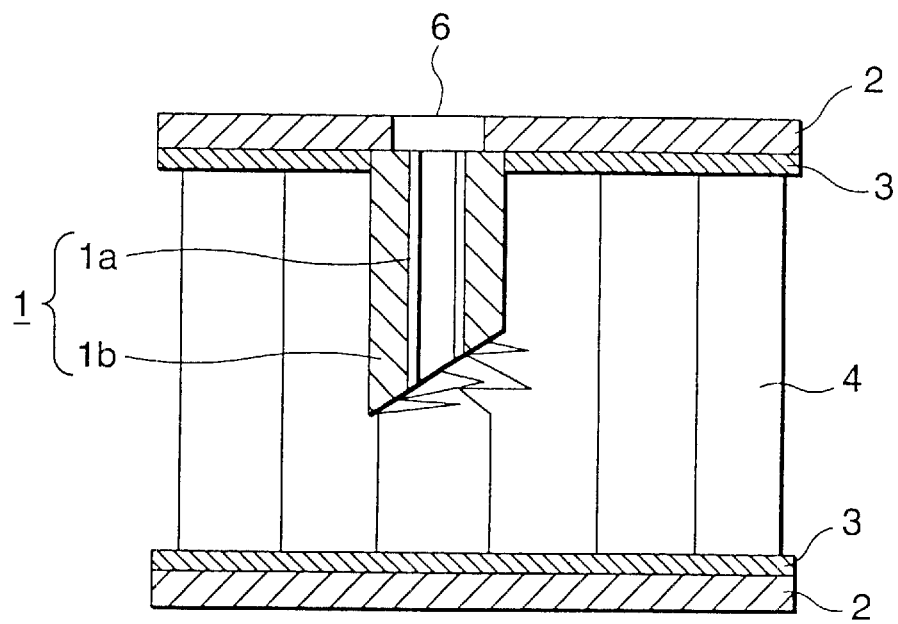
FIG. 1 is a cross-sectional diagram illustrating a sandwich panel in accordance with a first embodiment of the present invention.
Figure 2:
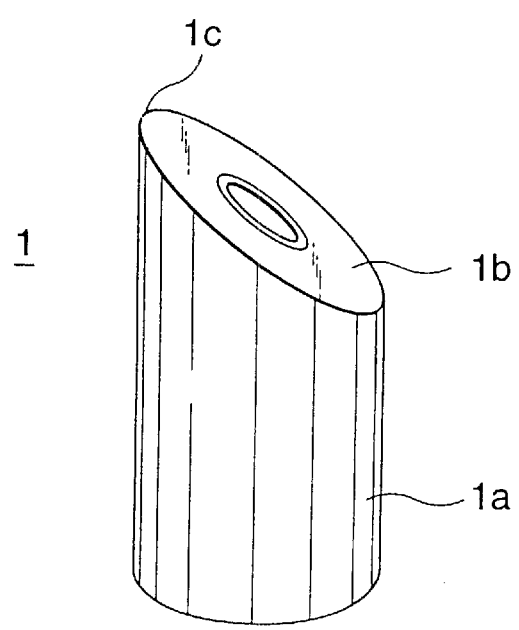
FIG. 2 is a perspective view illustrating an insert in accordance with the first embodiment of the present invention.

FIG. 1 is a cross-sectional diagram illustrating a sandwich panel in accordance with a first embodiment of the present invention. FIG. 2 is a perspective view illustrating an insert in accordance with the first embodiment of the present invention. FIG. 3 is a diagram illustrating the process of assembling the sandwich panel in accordance with the first embodiment of the present invention. In the drawings, reference numeral 1 denotes an insert; 1a, a threaded portion; 1b, a cutting portion; 1c, a sharp tip portion; and 6, a hole. It should be noted that, as for the sandwich panel in accordance with the first embodiment, portions identical or corresponding to those of the conventional sandwich panel are denoted by the same reference numerals, and a description thereof will be omitted.

First, referring to FIG. 2, a description will be given of the structure of the insert 1 in accordance with the first embodiment. The insert 1 is comprised of the threaded portion 1a having a threaded hole and the cutting portion 1b having the sharp tip portion 1c for force-cutting a core member 4. The insert 1 of this structure can be fabricated by merely obliquely cutting one end of a round rod through which a threaded hole is formed. It goes without saying that a round rod of a length corresponding to two pieces may be cut obliquely at the center.

Figure 3A:
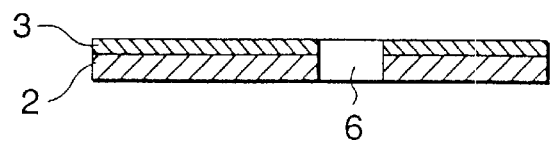
FIGS. 3A to 3D are diagrams explaining the process of assembling the sandwich panel in accordance with the first embodiment of the present invention.

Referring next to FIGS. 3A to 3D, a description will be given of a method of assembling the sandwich panel in accordance with the present invention. As a first step, as shown in FIG. 3A, a-film-like adhesive agent 3 exhibiting adhesiveness on heating is attached at room temperature to a facing member 2 to which the insert 1 is attached. At this time, one of the two protective sheets: (not shown) which were originally attached to both surfaces of the film-like adhesive agent 3 is kept intact. In that state, the hole 6 is machined with necessary and sufficient positioning accuracy by a turret puncher or the like. The inside diameter of this hole 6 is larger than the screw diameter, but should preferably be set as small as possible in order to secure an area of contact between the facing member 2 and the apparatus mounted on the sandwich panel, unless there is a special reason. It should be noted that, in the hole machining using the turret puncher, if the film-like adhesive agent 3 and the facing member 2 are punched out from above the protective sheet, the film-like adhesive agent 3 does not peel off, and they can be finely punched out.

Figure 3B:
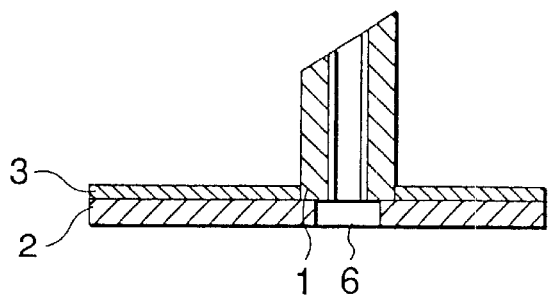

In a second step, as shown in FIG. 3B, the facing member 2 and the film-like adhesive agent 3 are placed on a working surface plate in such a manner that the film-like adhesive agent 3 is placed on the upper side, and after the unillustrated protective sheet is peeled off the film-like adhesive agent 3, the threaded portion 1a of the insert 1 is placed over the hole 6. At this time, positioning may be effected by using a jig or the like. In addition, if the insert 1 while being heated by a heating jig is pressed against the film-like adhesive agent 3, the insert 1 is firmly fixed to the facing member 2 since a portion of the film-like adhesive agent 3 becomes fused.

Figure 3C:
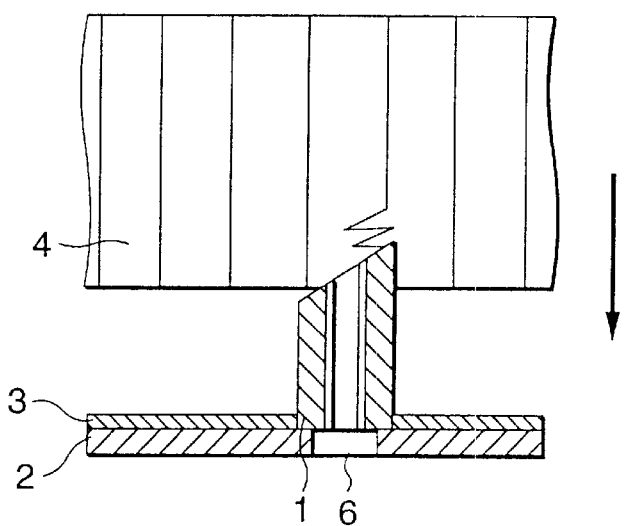

As a third step, as shown in FIG. 3C, the core member 4 is pressed downwardly from above in the drawing. In this embodiment, a description will be given of the case in which an aluminum-made honeycomb core is used. The core member 4, when pressed in, is force-cut by the sharp tip portion 1c located at the distal end of the insert 1, and is cut and buckled by a portion which abuts against the cutting portion 1b. The core member 4 is originally formed by bonding together thin aluminum foils. Although the core member 4 has a large withstanding force against a compressive force while it maintains the honeycomb shape, once its shape is severed, it is crushed easily. Namely, if the core member 4 around the insert 1 is finely cut by the cutting portion 1b of the insert 1, the core member 4 on top of it is crushed easily, so that the forcing in of the core member 4 can be completed with a very small force. In addition, the spring back after completion of the forcing in is very small. On the contrary, the portion of the core member 4 which is not cut has very high rigidity, the crushing of the core member 4 does not spread more than is necessary.

Figure 3D:
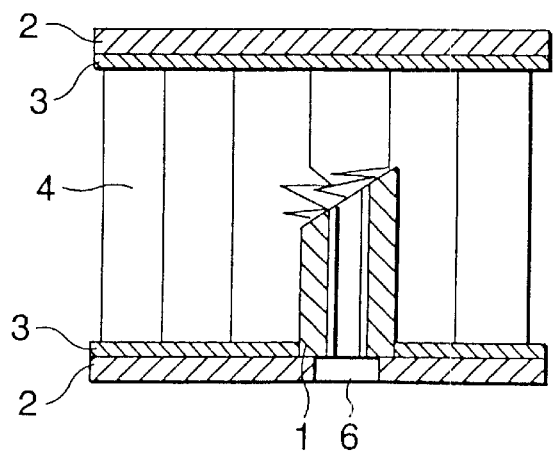

As a fourth step, as shown in FIG. 3D, if the film-like adhesive agent 3 and the facing member 2 on the opposite side are supplied, and the adhesive agent 3 is allowed to cure on pressing and heating, a sandwich panel incorporating the insert 1 can be fabricated.

The productivity of the sandwich panel which is manufactured in the above-described manner is very high since it can be assembled in simple operations and the steps of sandwiching and the attachment of the insert can be effected collectively. In terms of the quality, since the rigidity of the core member 4 which is not cut does not decline, the strength as the sandwich panel is sufficient. In addition, since only the small-diameter holes 6 are formed in the facing member 2, the area of contact between the facing member 2 and the apparatus mounted on the sandwich panel becomes large, so that greater efficiency in heat transfer than that of the conventional product can be obtained. Further, in a case where the use of the insert 1 is the grounding between the apparatus mounted on the satellite and the sandwich panel, the area of contact between the facing member 2 and the apparatus mounted on the sandwich panel becomes large, and favorable grounding with small electrical resistance can be effected. As a result, there is an advantage in that a high-quality sandwich panel can be obtained with high productivity and at low cost.

Although in this embodiment the turret puncher is used in the cutting of holes in the facing member 2, this is because according to experiments conducted by the present inventors the turret puncher proved most suitable for preventing damage to the film-like adhesive agent 3 attached to the facing member 2. It goes without saying that the cutting of holes in the facing member 2 may be effected by a processing machine such as a laser machining apparatus or a water jet machining apparatus, or by hole cutting using a drill or an end mill.

Further, although in this embodiment a description has been given of the case where the threaded hole is provided through the insert, the threaded hole may be provided with a stopper so that the honeycomb which buckled during the force-cutting of the honeycomb core does not enter the threaded portion. The threaded through hole may, of course, be provided with a filling or covered with a seal or the like.

Figure 4:
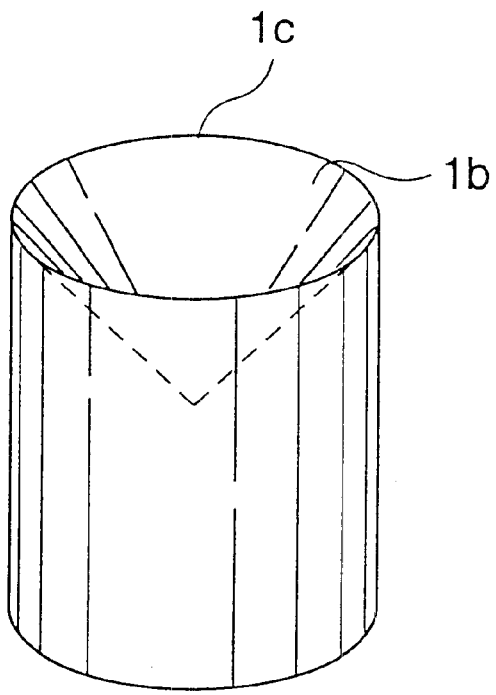
FIG. 4 is a perspective view illustrating another configuration of the insert in accordance with the first embodiment of the present invention.
Figure 5:
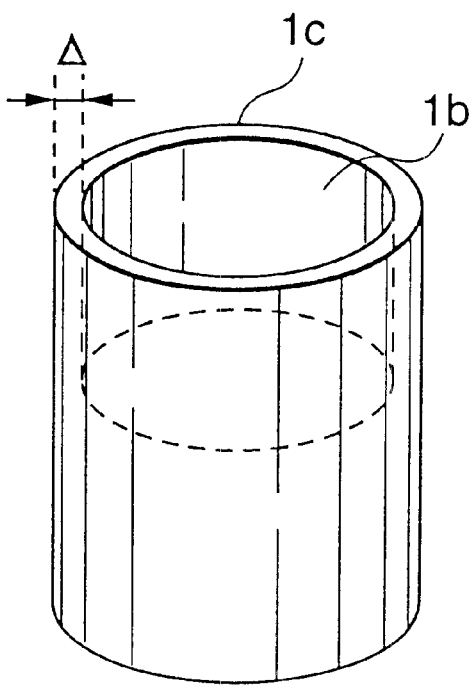
FIG. 5 is a perspective view illustrating still another configuration of the insert in accordance with the first embodiment of the present invention.

In addition, the shape of the cutting portion 1b of the insert 1 suffices if it has the shape having the sharp tip portion 1c for force-cutting the core member 4, and may be a conical recessed portion as shown in FIG. 4 or may be a hollow cylindrical recess as shown in FIG. 5.

In addition, the sharp tip portion 1c may be provided with a thickness of such an extent that it is capable of force-cutting the core member 4.

Second Embodiment

Figure 6:
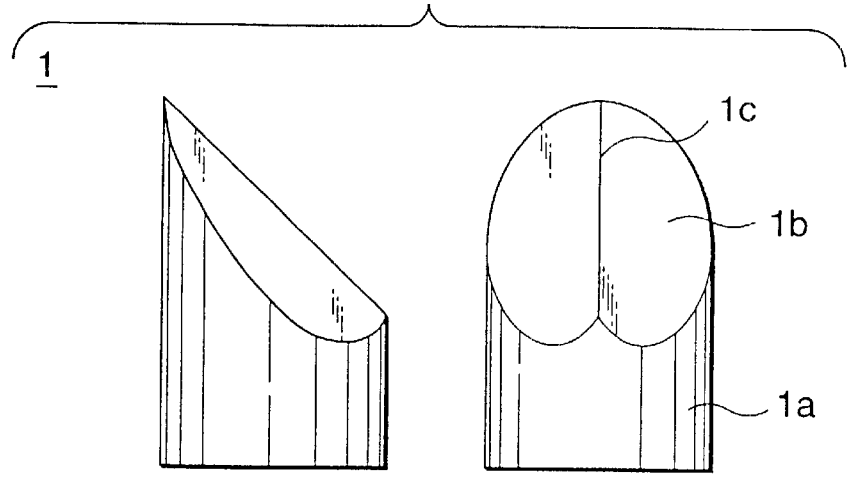
FIG. 6 is a front elevational view and a side elevational view illustrating the insert in accordance with a second embodiment of the present invention.

FIG. 6 is a front elevational view and a side elevational view illustrating an insert used in the sandwich panel in accordance with a second embodiment of the present invention. The insert 1 has its sharp tip portion 1c formed such that an end face of a round rod is cut at least twice obliquely in different directions, and a line of intersection (a ridge line) of two planes thereby obtained is used as the sharp tip portion 1c. The angle of intersection of these two planes is an acute angle. The process of manufacturing the sandwich panel is the same as that of the first embodiment, but since the ridge line of the sharp tip portion 1c is present, the core 4 can be cut more easily at the time of forcecutting the core 4 in the third step, so that the operation can be completed with a smaller pressing force.

It should be noted that although in the above-described embodiment the angle of intersection of the two planes is set to be an acute angle, this angle of intersection may not necessarily be an acute angle. If the angle of intersection is an acute angle, there is an advantage in that the force with which the core member 4 is force-cut can be small.

Third Embodiment

Figure 7:
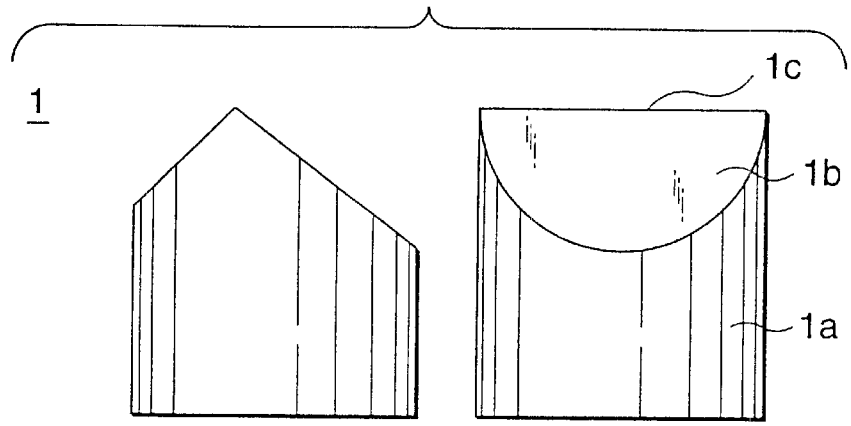
FIG. 7 is a front elevational view and a side elevational view illustrating the insert in accordance with a third embodiment of the present invention.

FIG. 7 is a front elevational view and a side elevational view illustrating an insert used in the sandwich panel in accordance with a third embodiment of the present invention. The insert 1 is obtained by cutting a round rod obliquely twice, and the insert 1 is characterized by having the ridge line 1c which strikes against the core member 4 in parallel therewith. Although the process of manufacturing the sandwich panel is the same as those of the first and second embodiments, but since the ridge line 1c strikes against the core member 4 in parallel therewith, the insert 1 and the core member 4 abut against each other in parallel at the time of force-cutting the core 4 in the third step, so that the operation can be completed in a stabler state in which the tilting or the like of the insert 1 is small.

Fourth Embodiment

Figure 8:
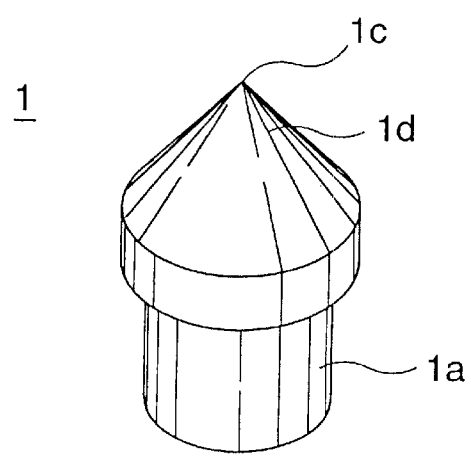
FIG. 8 is a perspective view illustrating the insert in accordance with a fourth embodiment of the present invention.

FIG. 8 is a perspective view illustrating an insert used in the sandwich panel in accordance with a fourth embodiment of the present invention. This insert is provided with a shape having a conical cutting portion 1d whose apex serves as the sharp tip portion 1c. In a case where the core member 4 is a foam core, the pressing force at the time of pressing into the core can be made small.

Fifth Embodiment

Referring next to FIGS. 9 to 12B, a description will be given of a fifth embodiment of the present invention. It should be noted that, as for the sandwich panel in accordance with this embodiment, portions identical or corresponding to those of the conventional sandwich panel or the sandwich panels in accordance with the other embodiments are denoted by the same reference numerals, and a description thereof will be omitted.

Figure 9:
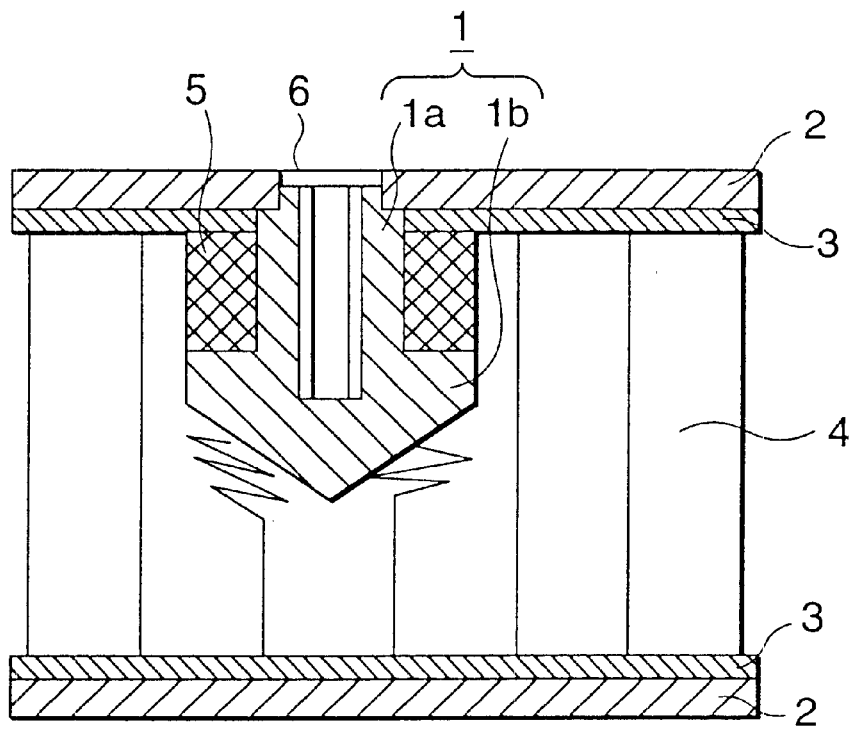
FIG. 9 is a cross-sectional diagram illustrating the sandwich panel in accordance with a fifth embodiment of the present invention.
Figure 10:
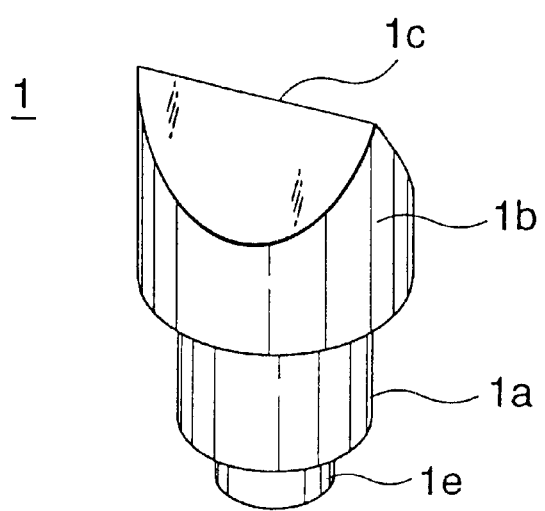
FIG. 10 is a perspective view illustrating the insert in accordance with a fifth embodiment of the present invention.

FIG. 9 is a cross-sectional diagram illustrating the sandwich panel in accordance with the fifth embodiment of the present invention. FIG. 10 is a perspective view illustrating the insert in accordance with the fifth embodiment of the present invention. FIGS. 11A, 11B and 12A, 12B are schematic diagrams explaining the manner in which the core member, particularly the honeycomb core, is force-cut.

First, the structure of the insert 1 will be described with reference to FIG. 10. The threaded portion 1a has the cutting portion 1b at one end and a positioning projection 1e at the other end. The positioning projection 1e is finished to such a size as to assume a fitting relationship with the hole 6 cut in the facing member 2. In addition, the height of the projection 1e is lower than the thickness of the facing member 2 so as not to project above the surface of the facing member 2 when assembled. The ridge line of the sharp tip portion 1c which is a line of intersection between two planes formed by cutting is located at an end of the cutting portion 1b. This ridge line of the sharp tip portion 1c passes along an axis which is symmetrical with the insert 1 and is disposed horizontally. At this time, the two planes on both sides of the ridge line of the sharp tip portion 1c, as viewed from a surface plate or the like for operation, are provided with equal gradients. In addition, the cutting portion 1b has a larger outside diameter than that of the threaded portion 1a.

Next, a description will be given of the assembling process. The assembling process in this embodiment is substantially the same assembling process of the first embodiment. This embodiment differs from the first embodiment in that the positioning projection 1e is fitted in the hole 6 in the second step to effect the positioning of the insert 1, and that an expandable adhesive agent 5 is wound around its trunk portion after attaching the insert 1 to the facing member 2.

That is, the insert 1 is heated by a not-shown heating jig to fuse a portion of the film-like adhesive agent 3, and the insert 1 is thereby fixed to the facing member 2. Then, if the not-shown heating jig is removed, the insert 1 soon assumes the ordinary temperature. After its temperature is lowered sufficiently, the expandable adhesive agent 5 is wound around the outside-diameter trunk portion of the threaded portion 1*a* (small-diameter portion) of the insert 1. It should be noted that the expandable adhesive agent 5 foams on heating. The cutting portion 1*b* of the insert 1 has an outside diameter larger than that of the threaded portion 1*a* of the insert 1, the cutting portion 1*b* of the insert 1 protects the expandable adhesive agent 5 from the core member 4 when the core member 4 is force-cut.

After force-cutting the core member 4, if the film-like adhesive agent 3 and the facing member 2 on the opposite side are supplied, and pressurization and heating are effected to cure the adhesive agent 3, a honeycomb sandwich core plate incorporating the insert 1 is formed. During this cure, the expandable adhesive agent 5 -foams and expands, thereby firmly bonding the threaded portion 1*a* of the insert 1 and the core member 4.

Figure 11A:
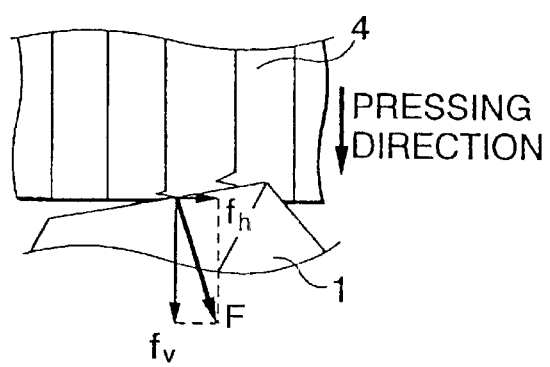
FIGS. 11A and 11B are schematic diagrams illustrating the manner in which a core member, particularly a honeycomb core, is cut.
Figure 11B:
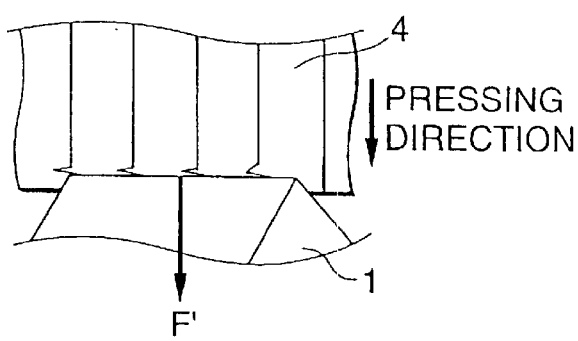
Figure 12A:
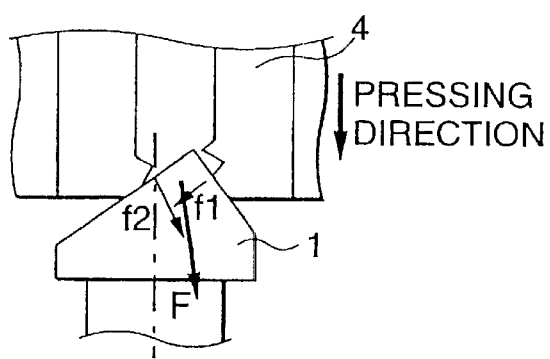
FIGS. 12A and 12B are schematic diagrams illustrating the manner in which the core member, particularly the honeycomb core, is cut.
Figure 12B:
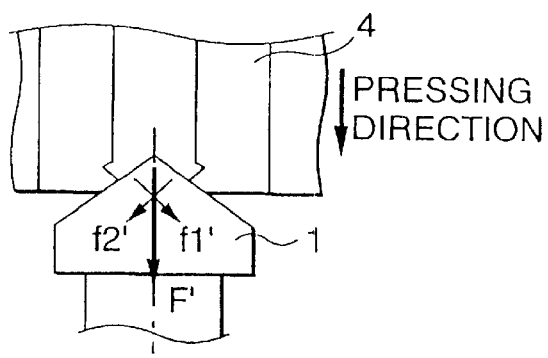

Referring to FIGS. 11A, 11B and 12A, 12B, a description will be given of the force acting on the insert 1 when forcecutting the core member 4, particularly the honeycomb core. First, as shown in FIG. 11A, in a case where the ridge line 1*c* of the insert 1 does not strikes against the core member 4 in parallel, the insert 1 is subjected to a reaction force F during the force-cutting of the core member 4. This reaction force F includes a horizontal component $f_h$ and acts to cause the insert 1 to be horizontally offset or overturned. In contrast, if the insert 1 is provided in such a manner as to strike against the core member 4 in parallel as shown in FIG. 11B, the reaction force F' acting on the insert 1 during the force-cutting of the core member 4 is constituted by only a vertical component $f_v$. Thus it can-be seen that the force which causes the insert 1 to be horizontally offset or overturned does not act. In addition, in a case where the ridge line 1*c* does not pass along the symmetric axis of the insert 1, e.g., in the case shown in FIG. 12A, since the imbalance of the forces f1 and f2 acting on the cutting surfaces of the insert 1 is large, their resultant force F produces the force of a horizontal component which would cause the insert 1 to be horizontally offset or overturned. However, in the case where the ridge line 1*c* passes along the symmetric axis of the insert 1, e.g. , in the case shown in FIG. 12B, the horizontal forces of the forces f1' and f2' acting on the cutting surf aces of the insert 1 are substantially balanced, and their resultant force F' substantially does not include a horizontal component. Accordingly, the force which would cause the insert 1 to be horizontally offset or overturned during the force-cutting of the core member 4 does not act.

In addition, with the sandwich panel manufactured by the method of this embodiment as shown in FIG. 9, since the cutting portion 1*b* having a diameter larger than that of the threaded portion 1*a* catches the expandable adhesive agent 5 when a pulling load is applied to the threaded portion 1*a*, the load is distributed to the core member 4 through the expandable adhesive agent 5. For this reason, the sandwich panel in accordance with this embodiment has the characteristic feature that the withstanding force against the pulling load is large in addition to the characteristic features mentioned in the other embodiments. In light of the fact that, with conventional sandwich panels, much time and trouble have been required by filling a filler by taking time after the attachment of the insert so as to obtain similar characteristic features, with the sandwich panel in accordance with this embodiment, since the expandable adhesive agent 5 is wound around the insert prior to the sandwiching process and the adhesive agent is cured in the sandwiching process, the fixation of the insert and the core member can be effected very easily, and productivity is improved remarkably.

It should be noted that although, in FIG. 10, the example is shown in which the ridge line 1*c* strikes against the core member 4 in parallel, and the insert 1 is provided in such a manner as to be located on the symmetrical axis of the insert 1, the present invention is not necessarily be limited to the illustrated shape.

In addition, although the expandable adhesive agent 5 is wound around the trunk portion of the insert 1 after attaching the insert 1 to the facing member 2, the insert 1 may be attached to the facing member 2 after the expandable adhesive agent 5 is wound in advance around the trunk portion of the insert 1.

Sixth Embodiment

Figure 13:
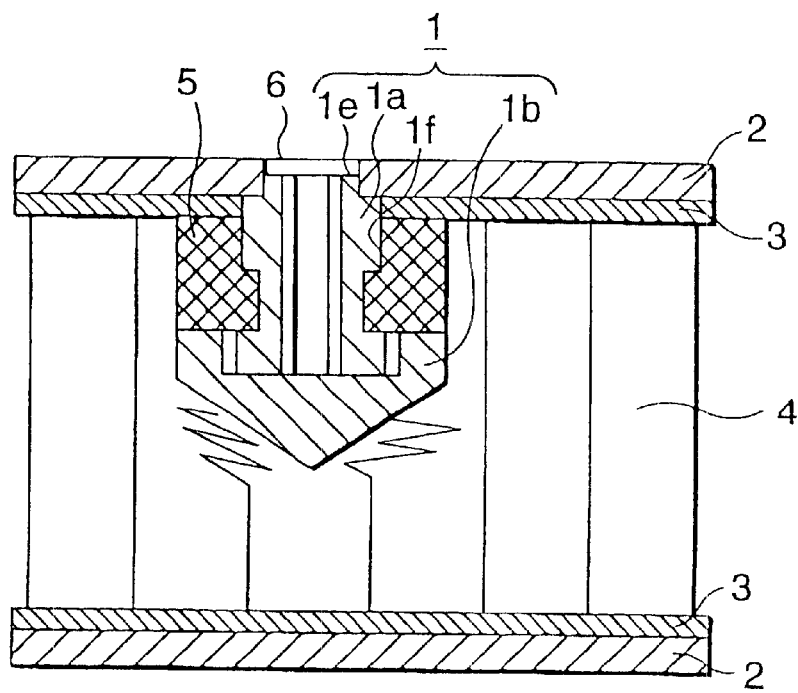
FIG. 13 is a cross-sectional diagram illustrating the sandwich panel in accordance with a sixth embodiment of the present invention.
Figure 14:
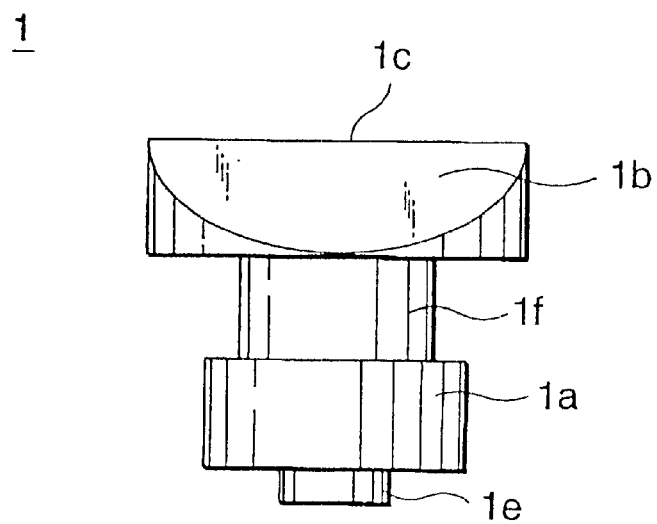
FIG. 14 is a side elevational view illustrating the insert in accordance with the sixth embodiment of the present invention.
Figure 15:
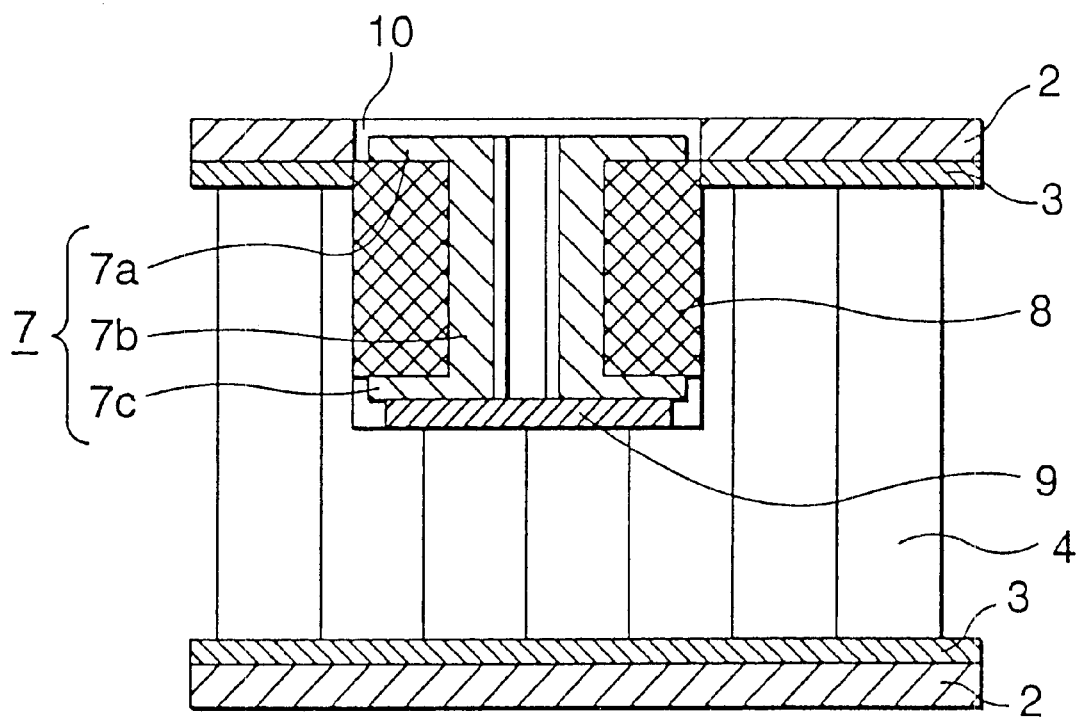
FIG. 15 is a cross-sectional diagram illustrating a conventional sandwich panel.
Figure 16:
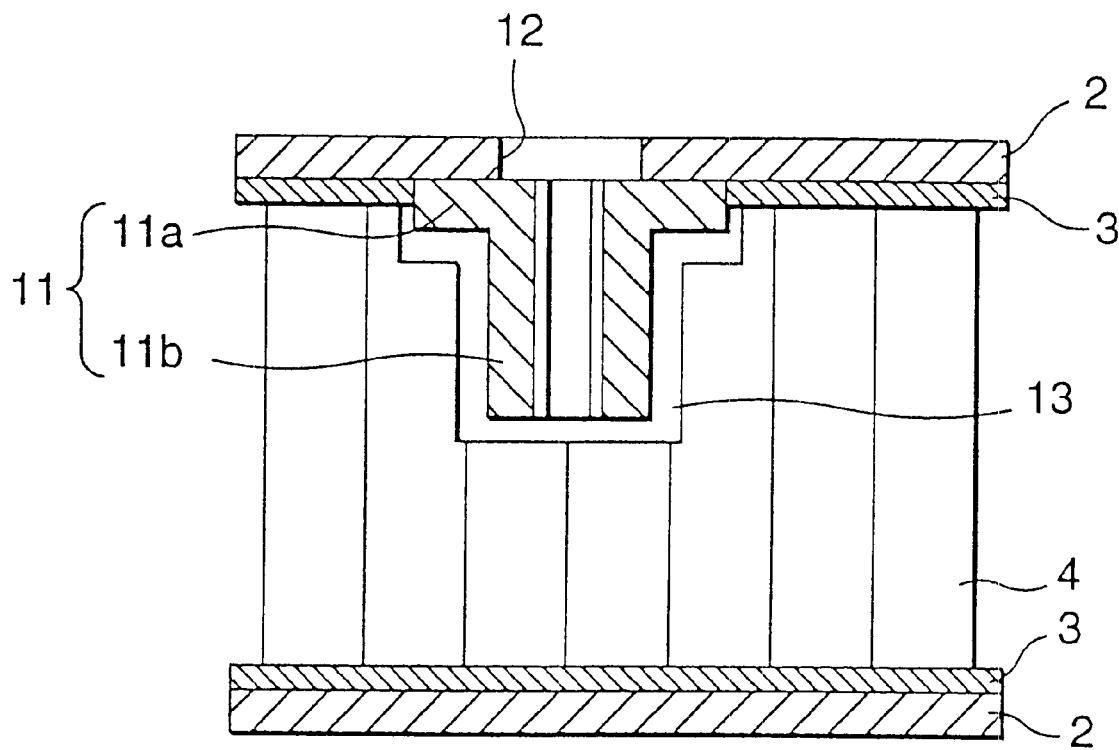
FIG. 16 is a cross-sectional diagram illustrating another conventional sandwich panel.

FIG. 13 is a cross-sectional diagram illustrating the sandwich panel in accordance with a sixth embodiment of the present invention. FIG. 14 is a side-elevational view illustrating the insert in accordance with the sixth embodiment of the present invention. In this embodiment, the threaded portion 1*a* and the cutting portion 1*b* are separate component parts, and the threaded portion 1*a* has an annular groove portion If. As can be seen from FIG. 13, the cutting portion 1*b* is merely placed on the threaded portion 1*a*. These two component parts need not be rigidly fixed to each other in the process of assembling the sandwich panel, and there may be some leeway between these component parts. The purpose of provision of the groove portion 1*f* is to transmit the pulling load acting on the insert 1 to the expandable adhesive agent 5 by allowing the expandable adhesive agent 5 to enter the groove portion 1*f*. By forming the threaded portion 1*a*, which is a small-diameter portion, as a separate component part, the threaded portion 1*a* can be machined from a small-diameter basic material, so that the material yield can be improved. In addition, since the heat capacity of the component becomes small when heating and attaching the threaded portion 1*a* to the facing member 2, the operational efficiency improves. Incidentally, since the assembling process is substantially similar to that of the fifth embodiment, a description thereof will be omitted.

The threaded portion 1*a* and the cutting portion 1*b* in this embodiment may be formed of the same material, but materials may be selectively used by, for example, using titanium for the threaded portion 1*a* and an aluminum alloy for the cutting portion 1*b*.

In addition, at this juncture, a thermoplastic material may be used for the cutting portion 1*b* to allow the cutting portion 1*b* to fill the space between the insert 1 and the core member 4 in the sandwiching process.

Further, in a case such as where sufficient pulling strength cannot be obtained by the groove portion 1*f* alone, the two components of the threaded portion 1*a* and the cutting portion 1*b* may be joined together in the assembling process by such as a method in which an externally threaded portion is provided on the cutting portion 1*b*.

Furthermore, although the groove portion 1*f* is provided in this embodiment, a stepped portion may be provided instead of the groove, and a smaller-diameter portion may be provided on the small-diameter portion (not shown).

Seventh Embodiment

A seventh embodiment will be described with reference to FIGS. 17 to 19. It should be noted that, as for the sandwich panel in accordance with this embodiment, portions identical or corresponding to those of the conventional sandwich panel or the sandwich panels in accordance with the other embodiments are denoted by the same reference numerals, and a description thereof will be omitted.

Figure 17:
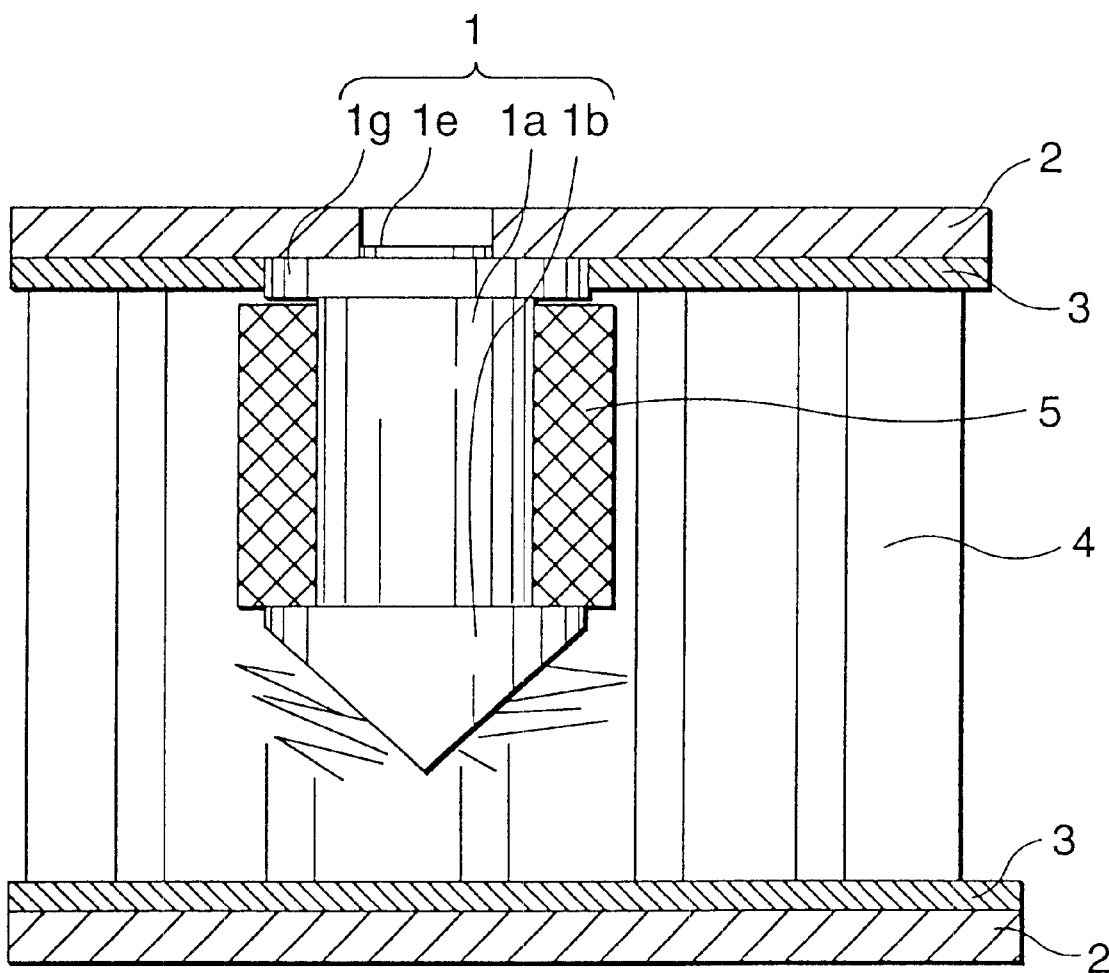
FIG. 17 is a cross-sectional diagram illustrating the sandwich panel in accordance with a seventh embodiment of the present invention.
Figure 18:
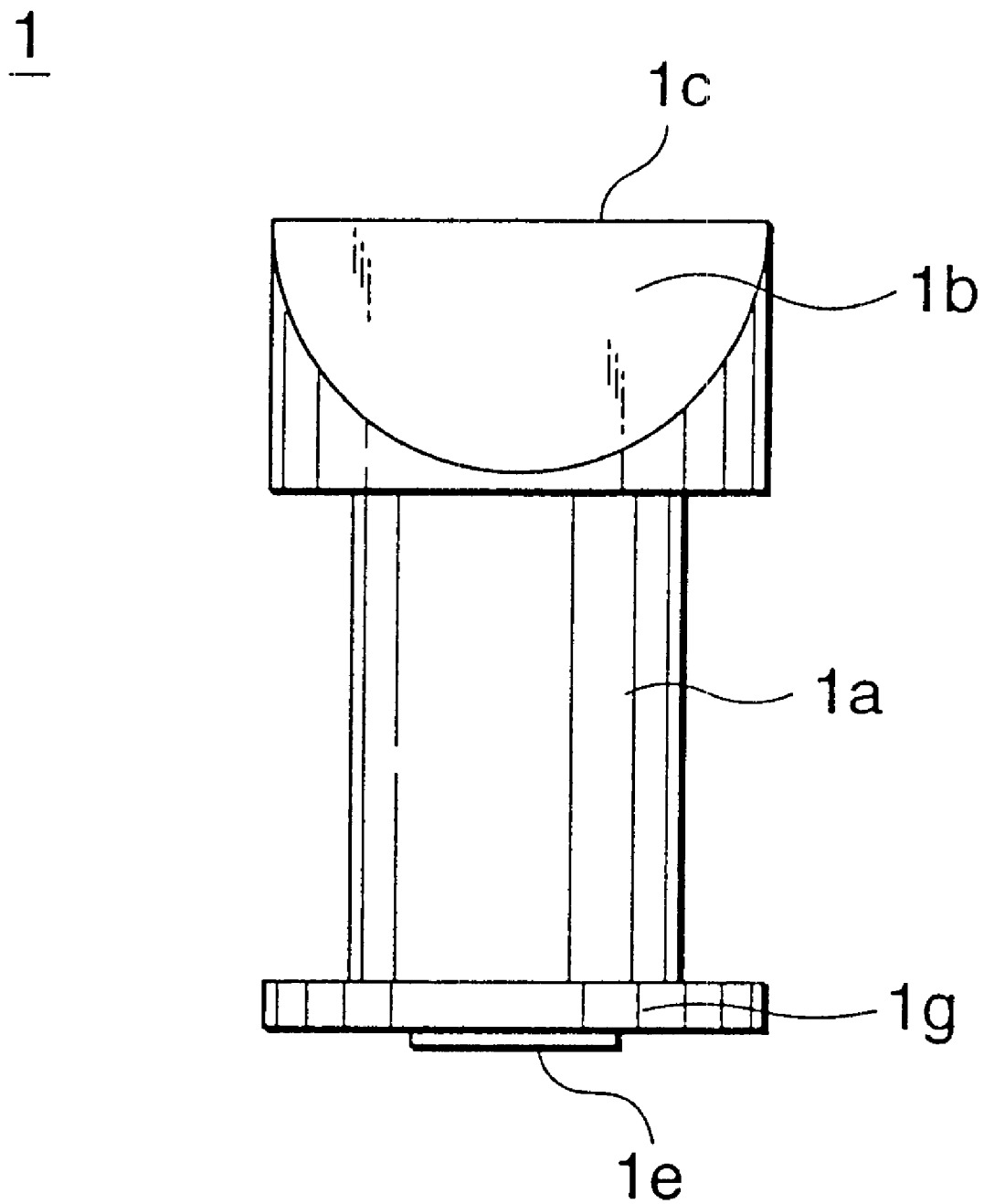
FIG. 18 is a side elevational view illustrating the insert in accordance with the seventh embodiment of the present invention.
Figure 19A:
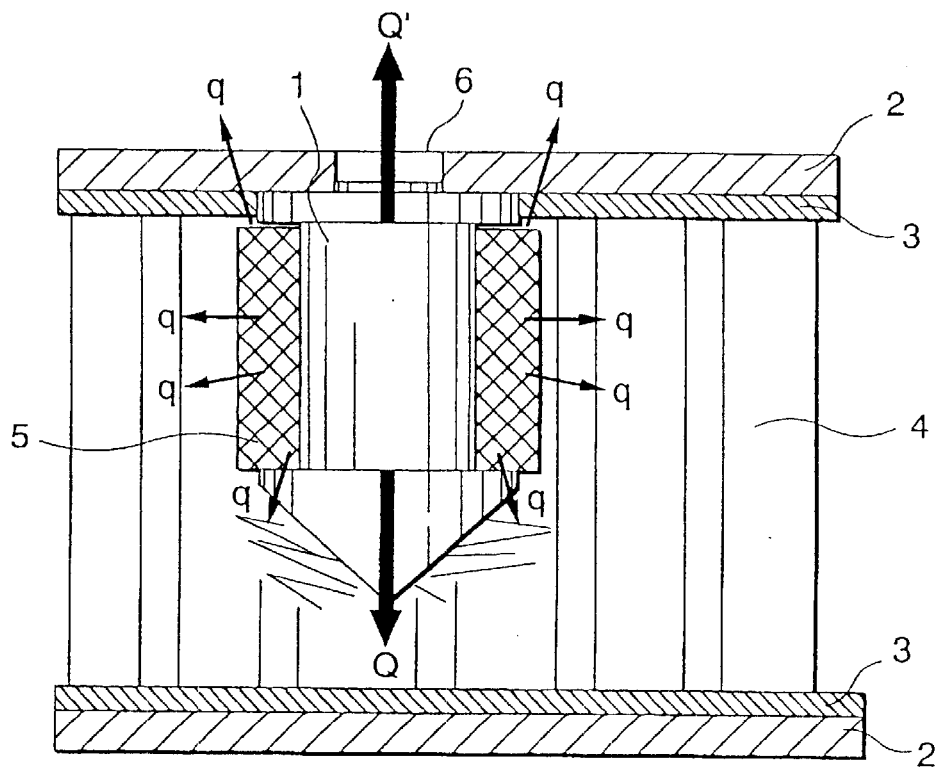
FIGS. 19A and 19B are diagrams for explaining a force exerted on the circumstance when the expandable adhesive agent foams.
Figure 19B:
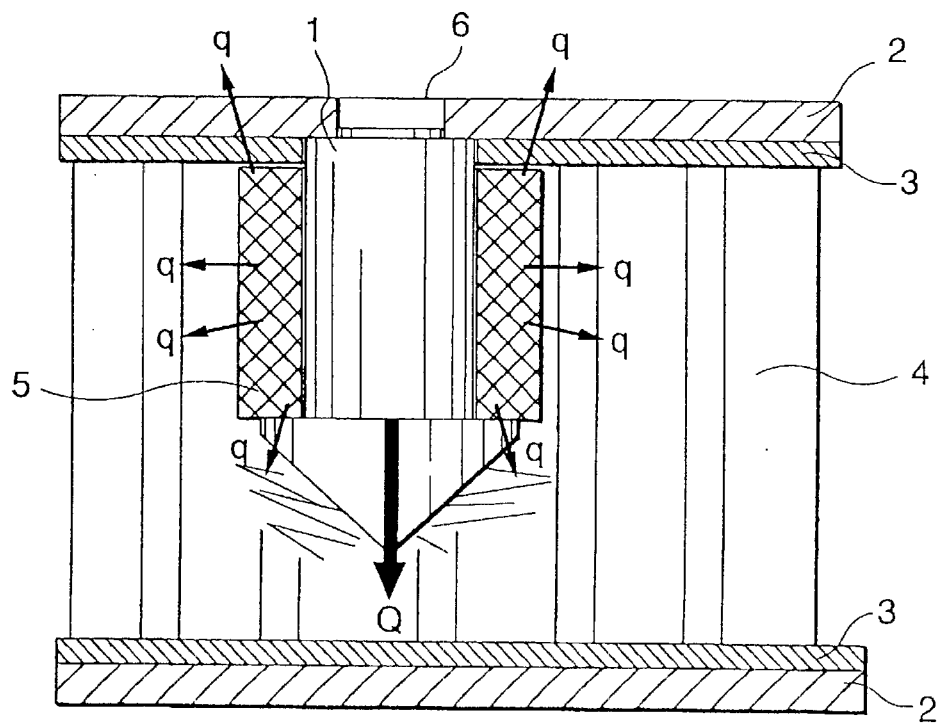

FIG. 17 is a cross-sectional diagram illustrating the sandwich panel in accordance with the seventh embodiment of the present invention. FIG. 18 is a side view illustrating the insert 1 in accordance with the seventh embodiment of the present invention. FIGS. 19A and 19B are schematic diagrams for explaining a force exerted on the circumstance when an expandable adhesive agent foams. In this embodiment, the insert 1 is equipped with a flange 1g.

Since the flange 1g allows the insert 1 and the facing member 2 to be brought in contact with each other on a larger area, there are advantages that not only adhesion of the facing member 2 to the film-like adhesive agent 3 due to the film-like adhesive agent 3 becomes firmer, but also when a pulling force is applied to the insert 1, a shearing force exerted on the facing member 2 through the flange 1g becomes small. In addition, the insert 1 is prevented from pulling off from the facing member 2 during an assembling process.

A phenomenon occurring during the assembling process will be described with reference to FIGS. 19A and 19B. FIG. 19A shows an appearance in which an expandable adhesive agent 5 foams when the adhesive is cured during the fourth step in the insert 1 having the flange 1g according to this embodiment, and FIG. 19B shows an appearance in which an expandable adhesive agent 5 foams when the adhesive is cured during the fourth step in the insert 1 having no flange 1g according to the fifth embodiment. In those figures, reference q is a pressure applied to the peripheral member when the expandable adhesive agent foams, Q and Q' are resultant forces which the insert 1 receives due to the pressure q. Particularly, Q represents a component exerted on the cutting portion 1b, and Q' is a component exerted on the flange 1g.

When the expandable adhesive agent 5 is heated at a temperature which is predetermined according to the material or higher, the expandable adhesive agent 5 starts to foam so that its volume increases. If there is a space around the expandable adhesive agent 5, the expandable adhesive agent 5 expands such that the space is filled with the expandable adhesive agent 5. However, in general, when the expandable adhesive agent 5 is employed, the space around the expandable adhesive agent 5 is made rather smaller than the foamed volume of the expandable adhesive agent 5. That is, since the expandable adhesive agent 5 further expands to continuously increase its volume even after the space has been filled with the expandable adhesive agent 5, the expandable adhesive agent 5 pushes itself against a wall surface that forms the space so as to be stuck onto the wall surface. As a result, the expandable adhesive agent 5 can be firmly adhered to the respective members. In other words, since the expandable adhesive agent 5 per se is going to continue to foam, it is firmly adhered to the insert 1, the core member 4 and the facing member 2. However, in this situation, the pressure q is exerted on the surrounding members from the expandable adhesive agent 5 although the pressure q is slight.

Although the pressure q is sufficiently small, the resultant force Q is exerted on the cutting portion 1b of the insert 1 as an external force in the embodiment shown in FIG. 19B. As usual, the insert 1 and the facing member 2 are firmly adhered to each other by the film-like adhesive agent 3 in the second step without any problems. However, if the insert 1 and the facing member 2 are insufficiently fixed to each other, for example, because a trouble occurs in working during the second step, the insert 1 may peel off from the facing member 2 due to the resultant force Q.

On the contrary, in this embodiment shown in FIG. 19A, the insert 1 has the resultant force Q' exerted on the flange 1g from the expandable adhesive agent 5. If the outer diameter of the flange 1g and the outer diameter of the cutting portion 1b are set to be nearly equal to each other, the resultant force Q and the resultant force Q' balance with each other, and a force exerted on the insert 1 from the expandable adhesive agent 5 acts as an internal force. Therefore, no force that peels the insert 1 off from the facing member 2 is exerted on the insert 1. Other steps in the assembling process are substantially identical with those in the fifth embodiment, and therefore their description is omitted.

As described above, in accordance with a first method of the present invention, in a method of manufacturing a sandwich panel in which a core member is provided between a pair of facing members, and to which an insert for mounting an apparatus thereon is attached, the sandwich panel is manufactured by providing: a first step of attaching another end portion of the insert whose one end portion is made sharp to an inner side of one of the facing members in which a hole is cut in advance; a second step of pressing the insert into the core member such that the one end portion of the insert force-cuts the core member; and a third step of attaching the other one of the facing members to a side of the core member opposing the insert-inserting side thereof. Therefore, there is an advantage in that it is possible to improve the productivity of a high-quality sandwich panel.

In addition, in accordance with a second method, in the first method, the, one end portion of the insert is provided with a line of intersection of two planes so as to be made sharp. Therefore, there is an advantage in that the core member, particularly the honeycomb core, can be cut finely.

In addition, in accordance with a third method, in the second method, the line of intersection is provided in such a manner as to abut against the core member in parallel. Therefore, there is an advantage in that it is possible to reduce the occurrence of the force which tends to horizontally offset the insert at the time of force-cutting the core member, particularly the honeycomb core.

In addition, in accordance with a fourth method, in the first method, the one end portion of the insert is formed in a conical shape. Therefore, there is an advantage in that the core member, particularly the foam core, can be cut finely.

In addition, in accordance with a fifth method, in any one of the second to fourth methods, if the line of intersection at the one end portion of the insert intersects with a central axis of the insert, there is an advantage that the forces which tend to horizontally offset the insert during the force-cutting of the honeycomb core, in particular, can be balanced, and the horizontal component of their resultant force can be made small. In addition, if an apex of the conical shape of the one end portion of the insert intersects with a central axis of the insert, there is an advantage that the pressing force during the force-cutting of the foam core, in particular, can be reduced.

In addition, in accordance with a sixth method, in the first method, in the first step, after the insert itself is heated, the insert is pressed against a film-like adhesive agent laid on the facing member, and a part of the film-like adhesive agent is thereby fused to bond and fix the insert to the facing member. Therefore, there is an advantage in that the operation of attaching the insert to the facing member can be simplified.

In addition, in accordance with a seventh method, in the first method, a projecting portion is provided at the other end portion of the insert, and the projecting portion of the insert is fitted in the hole cut in the facing member in the first step so as to effect the positioning of the insert. Therefore, there is an advantage in that the positioning of the insert can be effected easily.

In addition, in accordance with an eighth method, in the first method, the insert has a small-diameter portion on its side where the facing member is attached, the diameter of the small-diameter portion being smaller than that of the one end portion, an expandable adhesive agent which foams on heating is wound around the small-diameter portion before the second step, and the expandable adhesive agent is allowed to cure in the third step. Therefore, there is an advantage in that sufficient pulling strength can be ensured without impairing productivity.

In addition, in accordance with a-ninth method, since an insert having a flange the diameter of which is identical or substantially identical with that of one end portion of the insert on a surface attached to the facing member, when the expandable adhesive agent foams, a force exerted from the expandable adhesive agent can be received by the flange. Also, a force which is exerted on the core cutting portion of the insert from the expandable adhesive agent and is going to peel off the insert from the facing member can be canceled. Further, since the insert adheres to the facing member over a large area, not only the firm fixing of the insert to the facing member can be realized, but also a shearing force exerted on the facing member when a pulling force exerted on the insert is transmitted to the facing member can be reduced.

In addition, in accordance with a tenth method, in the eighth method, the one end portion and the small-diameter portion of the insert are formed as separate component parts. There are advantages in that the material yield improves, and the operational efficiency improves since the heat capacity at the time of heating and attaching the insert to the facing member becomes small. In addition, by selectively using materials for the small-diameter portion and the one end portion, it is possible to enhance the function while holding down the overall material cost.

In addition, in accordance with an eleventh method, in the eighth method, a stepped portion or-a groove portion is provided at the small-diameter portion of the insert to allow the expandable adhesive agent to flow around the stepped portion or the groove portion. Therefore, there is an advantage in that it is possible to ensure a greater pulling strength.

In addition, in accordance with a twelfth method, in the first method, a thermosensitive material is used as the one end portion of the insert to allow the material to fill a space between the insert and the core member in the third step. There is an advantage in that sufficient pulling strength can be ensured without impairing productivity.

In addition, the sandwich panel in accordance with the present invention is a sandwich panel in which a core member is provided between a pair of facing members, and to which an insert for mounting an apparatus thereon is attached, wherein the insert is attached to an inner side of one of the facing members in which a hole is cut, an end portion of the insert on a side away from a facing-member attaching side thereof is made sharp, and the insert is attached by force-cutting the core member by the end portion. Therefore, an advantage is offered in that it is possible to obtain a high-quality sandwich panel with high productivity.

What is claimed is:

1. A method of manufacturing a sandwich panel in which a core member is provided between a pair of facing members, and to which an insert for mounting an apparatus thereon is attached, comprising the steps of:

attaching one end portion of said insert, whose other end portion is made sharp, to an inner side of one of said facing members in which a hole is cut in advance;

pressing said insert into said core member such that said other end portion of said insert force-cuts said core member; and attaching the other one of said facing members to a side of said core member opposing the insert-inserting side thereof.

2. The method of manufacturing a sandwich panel according to claim 1, wherein said other end portion of said insert is provided with a line of intersection of two planes so as to be made sharp.

3. The method of manufacturing a sandwich panel according to claim 2, wherein said line of intersection abuts against said core member in parallel.

4. The method of manufacturing a sandwich panel according to claim 1, wherein said other end portion of said insert is formed in a conical shape.

5. The method of manufacturing a sandwich panel according to claim 1, wherein said sharp end portion of said insert intersects with a central axis of said insert.

6. The method of manufacturing a sandwich panel according to claim 1, wherein said first step further comprises the steps of heating said insert, pressing said insert against a film-like adhesive agent laid on said facing member to thereby fuse a part of said film-like adhesive agent on said insert and said insert is bonded to said facing member.

7. The method of manufacturing a sandwich panel according to claim 1, wherein a projecting portion is provided at the one end portion of said insert, and said projecting portion of said insert is fitted in said hole cut in said facing member in said first step so as to effect the positioning of said insert.

8. The method of manufacturing a sandwich panel according to claim 1, wherein said insert has a small-diameter portion on said one end portion where said facing member is attached, the diameter of said small-diameter portion being smaller than that of said one end portion, an expandable adhesive agent which foams on heating is wound around said small-diameter portion before said pressing step, and said expandable adhesive agent is allowed to cure in said attaching step.

9. The method of manufacturing a sandwich panel according to claim 8, wherein said insert has a flange the diameter of which is identical or substantially identical with the diameter of said one end portion of said insert on a surface attached to the facing member.

10. The method of manufacturing a sandwich panel according to claim 8, wherein said one end portion and said small-diameter portion of said insert are formed as separate component parts.

11. The method of manufacturing a sandwich panel according to claim 10, further comprising a stepped portion or a groove portion at said small-diameter portion of said insert to allow said expandable adhesive agent to flow around said stepped portion or said groove portion.

12. The method of manufacturing a sandwich panel according to claim 10, further comprising a step of using a thermosensitive material at said one end portion of said insert to allow said material to fill a space between said insert and said core member in said attaching step.

13. A sandwich panel comprising:

a pair of members;

a honeycomb core member located between said pair of facing members;

an insert for mounting an apparatus in direct contact with the core member;

wherein (1) said insert is attached by an adhesive to an inner side of one of said facing members in which in which a hole is cut, (2) an end portion of said insert on a side away from a facing-member attaching side thereof is made sharp, and (3) said core member is crushed by said end portion.

* * * * *